United States Patent
Carpignano et al.

(10) Patent No.: US 11,421,594 B2
(45) Date of Patent: Aug. 23, 2022

(54) PRESSURE RELIEF VALVE

(71) Applicant: Microtecnica S.r.l., Turin (IT)

(72) Inventors: Claudio Carpignano, Piobesi Torinese (IT); Dario Turturici, Collegno (IT)

(73) Assignee: MICROTECNICA S.R.L., Turin (IT)

( * ) Notice: Subject to any disclaimer, the term of this patent is extended or adjusted under 35 U.S.C. 154(b) by 561 days.

(21) Appl. No.: 16/424,541

(22) Filed: May 29, 2019

(65) Prior Publication Data
US 2019/0368418 A1 Dec. 5, 2019

(30) Foreign Application Priority Data
May 29, 2018 (EP) ..................................... 18275072

(51) Int. Cl.
| F16K 15/02 | (2006.01) |
| F02C 7/047 | (2006.01) |
| F02C 6/08 | (2006.01) |
| F16K 21/00 | (2006.01) |

(52) U.S. Cl.
CPC .............. F02C 7/047 (2013.01); F02C 6/08 (2013.01); F16K 15/026 (2013.01); F16K 21/00 (2013.01)

(58) Field of Classification Search
CPC ......... Y10T 137/7925; Y10T 137/7929; Y10T 137/2663; F16K 15/026; F16K 17/02
See application file for complete search history.

(56) References Cited

U.S. PATENT DOCUMENTS

| 3,122,160 A * | 2/1964 | Carr .................... F16K 17/0433 |
| | | 137/484.2 |
| 4,742,846 A | 5/1988 | DiBartolo |
| 2005/0097880 A1* | 5/2005 | Jansen .................. F16K 49/005 |
| | | 60/39.281 |
| 2009/0183782 A1 | 7/2009 | Martin |
| 2012/0305108 A1 | 12/2012 | Jerchen et al. |

FOREIGN PATENT DOCUMENTS

| EP | 1593856 A1 | 11/2005 |
| JP | 2013133889 A | 7/2013 |

OTHER PUBLICATIONS

JP2013133889, printed Oct. 2021.*
Extended European Search Report for International Application No. 18275072.9 dated Nov. 22, 2018, 7 pages.

* cited by examiner

*Primary Examiner* — Robert K Arundale
(74) *Attorney, Agent, or Firm* — Cantor Colburn LLP

(57) ABSTRACT

A valve has a fluid inlet, a housing comprising a first chamber and a fluid passage extending from the fluid inlet to the first chamber, one or more exhaust channels in fluid communication with the first chamber such that, in use, a pressurised fluid entering the first chamber is exhausted through the one or more exhaust channels, a device movable between a closed position and an open position, and a resilient member configured to bias the device towards its closed position. The valve further comprises one or more additional fluid channels having an outlet within each of the one or more exhaust channels that create a Venturi effect in use with the pressurised air exhausted through the one or more exhaust channels.

18 Claims, 5 Drawing Sheets

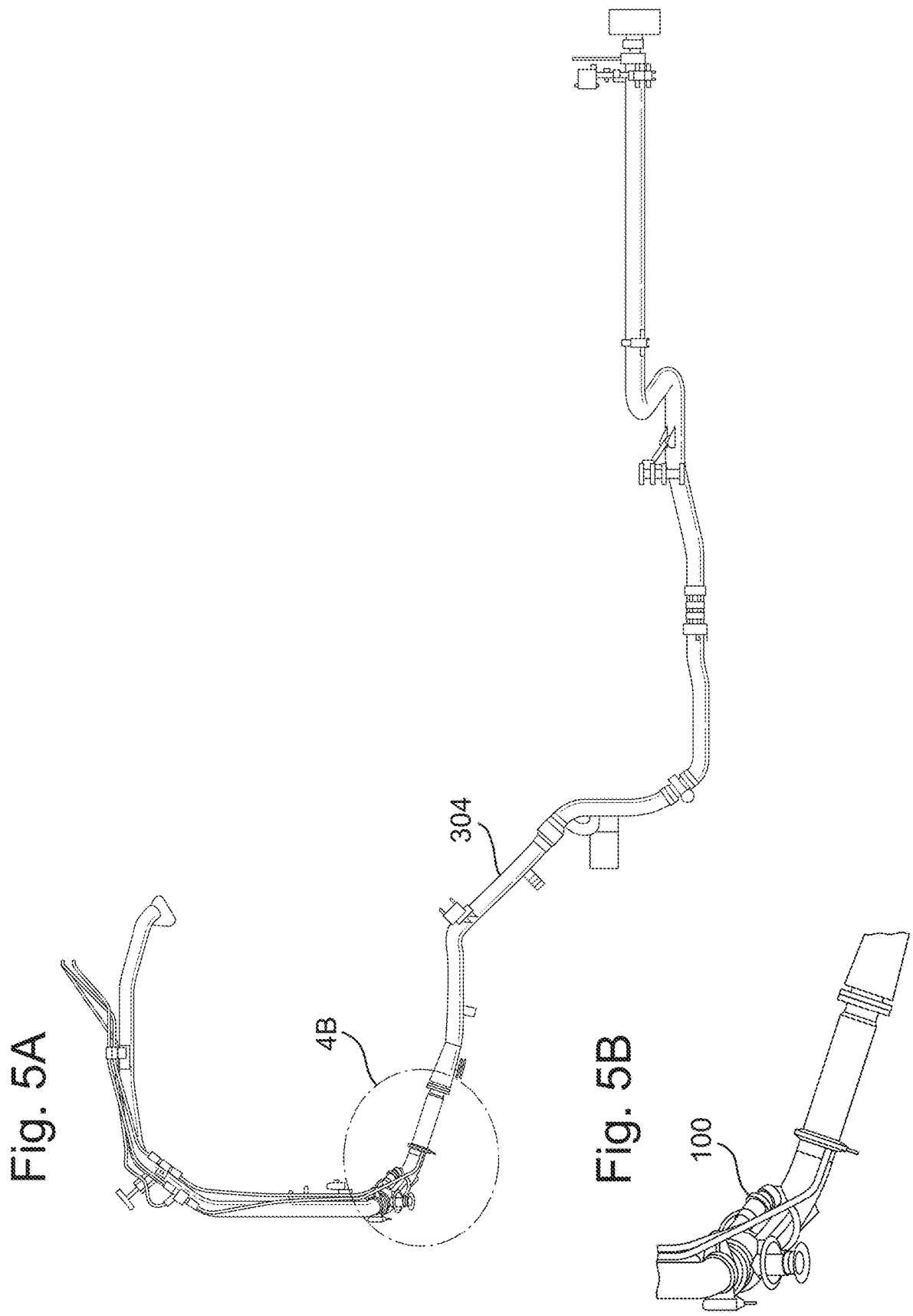

PRESSURE RELIEF VALVE

FOREIGN PRIORITY

This application claims priority to European Patent Application No. 18275072.9 filed May 29, 2018, the entire contents of which is incorporated herein by reference.

FIELD

The present disclosure relates generally to a pressure relief valve for controlling the release of a pressurised fluid (e.g. air) from an environment, for example high-temperature environments such as those experienced within a gas turbine engine.

BACKGROUND

FIG. 1 shows a conventional valve 10 that comprises a housing 12 for holding and enclosing various parts of the valve 10. The housing 12 has a portion 14 for mating or connecting to a suitable structure, such as a high-pressure region of an engine or a de-icing system in which hot air is bled from an engine and used to de-ice other components of a vehicle that the engine drives. In this manner, the valve 10 acts as a pressure relief valve in order to keep pressure at a predefined level or within a predefined pressure range.

The mating portion 14 may comprise a screw thread indicated at 16 for screwing into an aperture in the structure, which aperture may have a cooperating screw thread so as to create a seal between the mating portion 14 and the structure. A flange portion 18 of the housing 12 extends from the mating portion 14 and is configured to host an appropriate seal.

The housing 12 comprises a main body portion 20 that is generally cylindrical and is connected to the flange portion 18 via an intermediate portion 22. The intermediate portion 22 comprises a number of discharge ports 24 that extend around its periphery, i.e., around the longitudinal axis A of the valve 10.

The valve 10 comprises an interior defined by the volume within the valve housing 12, which interior comprises a channel 30 defined by the portion of the interior at the mating portion 14. In use the channel 30 is configured to be exposed to a pressurised atmosphere.

The valve 10 further comprises a plunger 40 that is configured to move within the interior of the valve 10 between a closing position, in which the plunger 40 blocks the channel 30, and an open position, in which the plunger 40 does not block the channel 30.

The plunger 40 is forced towards its closing position, such that when the pressure is below a set-point value the plunger 40 blocks (or seals) the channel 30 and prevents fluid (e.g., air) escaping from the pressurised atmosphere through the valve 10. In its closing position, the plunger 40 may be substantially sealed against an edge 19 of the flange portion 18, preventing fluid from escaping the channel 30.

In order to force the plunger 40 towards its closing position as aforesaid, a piston 42 and resilient member 44 (e.g., a spring) are provided, wherein the piston 42 is biased against the plunger 40 by the resilient member 44. The resilient member 44 is biased between the piston 42 and a cap 50 that fits into an end 15 of the valve housing 12 that is opposite the connecting portion 14. The cap 50 comprises a vent hole 52 to allow pressurised fluid to escape from the interior of the valve housing 12 that comprises the resilient member 44.

In use, if the pressure of fluid in the pressurised atmosphere reaches a certain, predefined value or level, this will exert a force on the plunger 40 such that it is forced in the direction of the piston 42 and against the action of the resilient member 44. As such, the plunger moves away from the edge 19 and fluid is permitted to escape from the channel 30 and will flow primarily out of the discharge ports 24.

Although the various components (e.g., the plunger 40 and piston 42) may have tight tolerances with respect to the interior of the valve housing 12, due to the need to provide a reliable, predefined pressure level, the various components must move as smoothly as possible within the housing 12. As such, a tight air seal is not typically provided between, e.g., the plunger and an inner cylindrical surface 23 of the intermediate portion 22 within which it moves. Therefore, a portion of the fluid will also flow into the interior of the valve housing 12 containing the resilient member 44 and out of the vent hole 52.

There are various reasons why fluid flowing into the interior of the valve housing 12 containing the resilient member 44 may be undesirable. It has been recognised that this can affect the long-term and short-term reliability of the resilient member, and in particular the spring constant. For example, this can cause the predefined pressure level of the valve 10 to drift throughout use. Such effects can have a detrimental effect on the operation of the valve 10, especially, for example, in high-temperature applications.

It is desired to improve the reliability of conventional pressure relief valves, such as that shown in FIG. 1, particularly in applications where the valve is required to operate in a high temperature environment.

SUMMARY

There is provided a valve for controlling the release of a pressurised fluid from an environment. The valve comprises a fluid inlet, a housing comprising a first chamber and a fluid passage extending from the fluid inlet to the first chamber, one or more exhaust channels in fluid communication with the first chamber such that, in use, a fluid (e.g. air) entering the first chamber from a pressurised environment is exhausted through the one or more exhaust channels, a device movable between a closed position and an open position, wherein in the closed position the device is configured to substantially seal the fluid passage and the first chamber such that a fluid is not able to flow from the fluid passage to the first chamber, and in the open position the device permits a fluid to flow from the fluid passage to the first chamber, and a resilient member configured to bias the device towards its closed position. In accordance with the disclosure the valve further comprises one or more additional fluid channels having an outlet within at least one of the one or more exhaust channels, and configured to create a Venturi effect in use with high velocity fluid being exhausted through the one or more exhaust channels.

Creating a Venturi effect as aforesaid leads to a number of technical effects, for example fluid is drawn through the additional channels, providing a cooling effect within the valve and helping to prevent the high velocity fluid from the pressurised environment from infiltrating other parts of the valve.

In use, high velocity fluid moving through the one or more exhaust channels may draw in fluid from the one or more additional channels to create the Venturi effect as aforesaid. The fluid may be drawn from a non-pressurised or external (e.g., ambient) environment, for example a non-pressurised chamber (e.g., the second chamber described below) or ambient air. The non-pressurised chamber may itself be exposed to an external environment, such as ambient air. This can increase the cooling effect achieved by the additional channels, since the ambient air or non-pressurised fluid may typically be of lower temperature than the pressurised fluid.

The outlet of each of the one or more additional channels is located adjacent an outlet of a respective one of the one or more exhaust channels. This has been found to optimise the Venturi effect. In further refinements to optimise this effect, a width of the one or more additional channels may be less than a width of the one or more exhaust channels. Alternatively, or additionally, an outlet of the one or more additional channels may be conical or tapered. Alternatively, or additionally, a longitudinal axis of the one or more additional channels may be substantially perpendicular to a longitudinal axis of the one or more exhaust channels.

The valve may further comprise a second chamber, and the one or more additional channels may be in fluid communication with the second chamber, and the resilient member may be at least partially located within the second chamber. This means that fluid (e.g., ambient air) may be drawn through the second chamber containing the resilient member, helping to prevent temperature fluctuations in the resilient member in use, and drift of the valve set-point as a result. As discussed above the second chamber may be vented to a non-pressurised environment, for example an ambient environment (e.g., ambient air).

The valve may further comprise a cap mounted onto an end of the valve housing and at least partially defining the second chamber, wherein the cap comprises a port configured as an inlet for non-pressurised or ambient fluid.

The device may comprises a surface configured to press against a portion of the valve housing to substantially seal the fluid passage to the first chamber when the device is in its closed position, and move away from the portion of the valve housing to create a gap therebetween to permit pressurised fluid to flow from the fluid passage to the first chamber when the device is in its open position.

In a refinement the surface may be angled towards the one or more exhaust channels such that, in use, pressurised fluid flowing through the gap is directed towards the one or more exhaust channels by the angled surface. The angled surface may be substantially parallel with a longitudinal axis of the one or more exhaust channels.

The valve may further comprise a piston located between the resilient member and the device, wherein the resilient member biases the piston towards the device to bias the device towards its closed position.

In an aspect there is provided an apparatus comprising a valve as described above, the apparatus comprising a structure (e.g., pipework or a container) configured for holding a pressurised fluid (and, in embodiments, holding the pressurised fluid), wherein the fluid inlet of the valve is exposed to the pressurised fluid, such that the valve is configured to control the release of the pressurised fluid from the structure.

The apparatus may comprise a gas turbine engine incorporating the valve. For example, the valve may be located within a nacelle section of the gas turbine engine.

BRIEF DESCRIPTION OF THE DRAWINGS

Various embodiments will now be described, by way of example only, and with reference to the accompanying drawings in which:

FIGS. 5A and 5B show the valve of FIGS. 2-4 installed in pipework, e.g., of a gas turbine engine.

DETAILED DESCRIPTION

Herewith will be described various embodiments of a pressure relief valve that has a modified geometry compared with the conventional valve housing described above, and more specifically provides a new geometry in which exhaust channels and additional fluid channels are used to create a suction effect inside the valve housing. This leads to a fluid (e.g., cooling air) entering the housing so as to remove heat from the valve and ensure long-term stability of the valve as described in more detail below.

Figure 2:
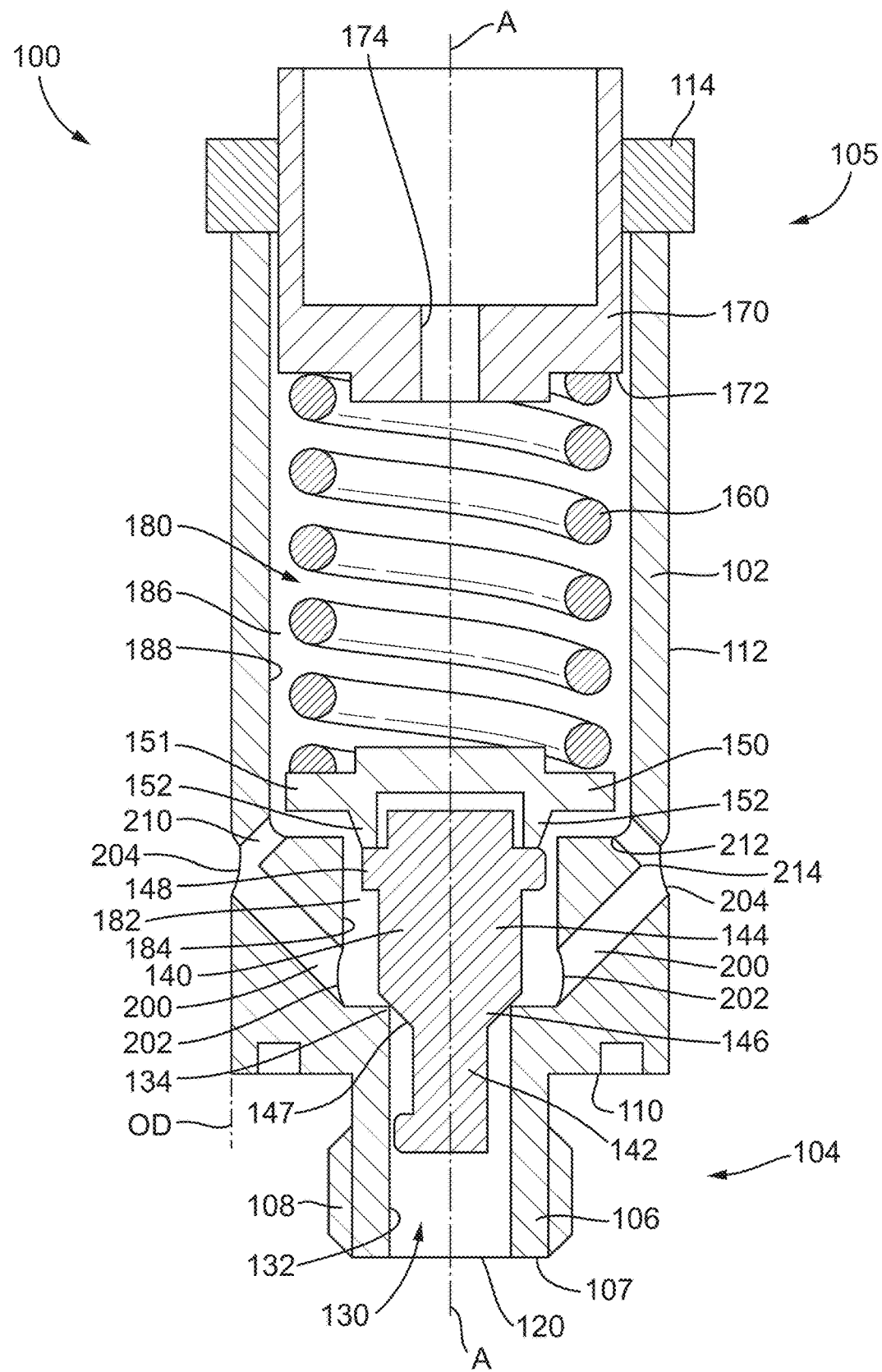
FIG. 2 shows an embodiment of the present disclosure including a valve.

FIG. 2 shows a valve 100 according to an embodiment of the present disclosure. The valve 100 is configured to control the release of a pressurised fluid from an environment exposed to (e.g., containing or holding) the pressurised fluid. The environment may be a region of a device, e.g., an engine that is held at a raised pressure (e.g., a compressor region of a gas turbine engine) or part of a de-icing system, in which hot air is bled from an engine (e.g., a gas turbine engine) and used, e.g., to de-ice other components of a vehicle (e.g., an aircraft) that the engine is associated with. In this manner, the valve 100 acts as a pressure relief valve that controls the build-up of pressure within the environment.

The pressure relief valves described herein are typically those having a set-point or predefined pressure level, which corresponds to the pressure at which the valve will begin to release fluid from the environment.

The valve 100 comprises a valve housing 102 that is substantially cylindrical and extends from a first end 104 to a second end 105. The valve housing 102 may be shaped other than cylindrical, for example cuboid. The valve housing 102 has a central longitudinal axis A extending from the first end 104 to the second end 105, and may be generally symmetrical around the central longitudinal axis A.

At its first end 104 the valve housing 102 comprises a reduced diameter portion 106 (the reduced diameter is optional), which is configured to mate with a structure that retains the pressurised fluid described above. The mating portion 106 may comprise any suitable connector, shown at 108 in FIG. 2, which may be a screw thread. In other embodiments, the mating portion 106 may be configured to mate with the structure by way of an interference, press or snap fit arrangement, although any suitable connecting method may be used, depending on the particular application. The mating portion 106 may be configured to fluidly seal against the structure using the connector 108.

The mating portion 106 may extend from a radial surface 110 of the valve housing 102 (as used herein, terms such as "axial" and "radial" are with respect to the central longitudinal axis A, unless otherwise specified). The radial surface 110 extends to an outer diameter (OD) of the valve housing 102. An outer surface 112 of the valve housing 102 is defined by the outer circumferential surface of the valve housing 102 located at the outer diameter. The outer surface 112 extends from its junction with the radial surface 110 to the second end 105 where it connects to a locking ferrule 114 that is configured to secure the cap 174 in place.

At its first end 104 the valve 100 comprises an inlet 120 located within an end surface 107 of the mating portion 106. The valve 100 further comprises a passage 130 defined by a first inner circumferential surface 132 of the valve housing 102, which passage 130 extends from the inlet 120 to an internal rim 134 of the valve housing 102. In the illustrated embodiment the passage 130 has a constant diameter with respect to the central longitudinal axis A, although this is not an essential feature of the disclosure.

The valve 100 further comprises a device 140 in the form of a plunger comprising a first portion 142 having generally a relatively small diameter that extends to a second portion 144 having generally a relatively large diameter via an angled connecting portion 146. The plunger 140 comprises a surface 147 configured to press against the rim 134 of the valve housing 102.

In the illustrated embodiment the surface 147 of the plunger 140 is formed by the angled connecting portion 146, although it will be appreciated that the plunger 140 could be a device having any suitable shape, such that the surface 147 that presses against the rim 134 may be defined differently to that shown, or the seal between the device 140 and the passage 130 could be created in a different manner.

The valve 100 comprises a piston 150 and a resilient member 160. The plunger 140 is pressed or biased against the rim 134 of the valve housing 102 by the piston 150 and the resilient member 160. Generally, the piston 150 is configured to transfer force from the resilient member 160 to the plunger 140. The piston 150 may comprise a generally flat body 151 and a plurality of pins 152 extending towards the plunger 140 from the body 151, although any suitable shape of piston 150 may be used. The plunger 140 comprises a radially extending, circumferential flange 148 and the pins 152 of the piston 150 are configured to contact the circumferential flange 148 of the plunger 140 to transfer a force from the resilient member 160 to the plunger 140.

The shape and design of the piston 150 in the illustrated embodiments is exemplary, and this specific shape is not essential to the broadest aspects of the present disclosure. Any suitable shape or design of piston could be used for various applications.

Generally, when the pressure of the pressurised fluid is below the set-point value of the valve 100, the plunger 140 is forced towards a closing position (shown in FIG. 2) in which the plunger 140 blocks (or seals) the channel 130 and prevents fluid (e.g., air) escaping from the pressurised atmosphere through the valve 100. In the illustrated embodiment this is achieved by the surface 147 being pressed or biased against the internal rim 134, although any suitable arrangement could be used. In its closed position, the plunger 140 may be fluidly sealed against the internal rim 134 (although a simple metal-to-metal seal may be sufficient), which helps to prevent fluid from escaping the channel 130.

The valve 100 further comprises a cap 170 that is mounted, e.g., fastened into the body 102 and secured by the ferrule 114.

The resilient member 160 is biased between the piston 150 and a radial surface 172 of the cap 170, such that the force that it exerts on the piston 150 and, in turn, plunger 140 can be varied by moving (e.g., screwing or unscrewing) the cap 170 along the central longitudinal axis A. This provides a simple way of modifying the set-point or predefined pressure level of the valve.

Moving the cap 170 along the axis A in the direction of the piston 150 will compress the resilient member 160 and increase the pressure on the plunger 140, meaning that the pressure required to displace the plunger (and the set-point or predefined pressure level) increases. Similarly, moving the cap 170 in the opposite direction along the axis A will decompress the resilient member 160 and decrease the pressure on the plunger 140, meaning that the pressure required to displace the plunger (and the set-point or predefined pressure level) decreases.

The valve housing 102 comprises an interior chamber 180, which contains the second portion 144 of the plunger 140, the piston 150 and the resilient member 160. The interior chamber 180 comprises a first chamber 182 defined by a second inner circumferential surface 184 of the valve housing 102, as well as a second chamber 186 defined by a third inner circumferential surface 188 of the valve housing 102. The first chamber 182 contains the second portion 144 of the plunger 140, and the second chamber 186 contains the resilient member 160 and piston 150. The first chamber 182 and the second chamber 186 may be adjacent to one another, and any fluid passing between the passages should be kept to a minimum.

The cap 170 comprises a vent hole 174 that is configured to allow fluid to pass from the surrounding environment of the valve 100 and into the second chamber 186 of the valve 100.

A plurality of exhaust channels 200 extend through the valve housing 102 from a respective inlet 202 defined in the first chamber 182 to an outlet 204 defined on the outer surface 112 of the valve housing 102. The plurality of exhaust channels 200 may subtend an angle with respect to the central longitudinal axis, wherein the angle may be acute, e.g., less than 90°, and optionally between 30° and 60°. The plurality of exhaust channels 200 may be angled towards the second chamber 186. Each of the plurality of exhaust channels 200 has a width W (see FIG. 3), which may be substantially constant along its length.

In accordance with the disclosure, a plurality of additional fluid channels 210 extend through the valve housing 102 from an inlet 212 defined in the second chamber 186 to an outlet 214 that is located adjacent a respective outlet 204 of each exhaust channel 200. The inlets 212 of the additional channels 210 may be located at an end of the third inner circumferential surface 188 located towards the first end 104 of the valve 100.

The exhaust channels 200 and/or the additional channels 210 may be substantially cylindrical.

Figure 3:
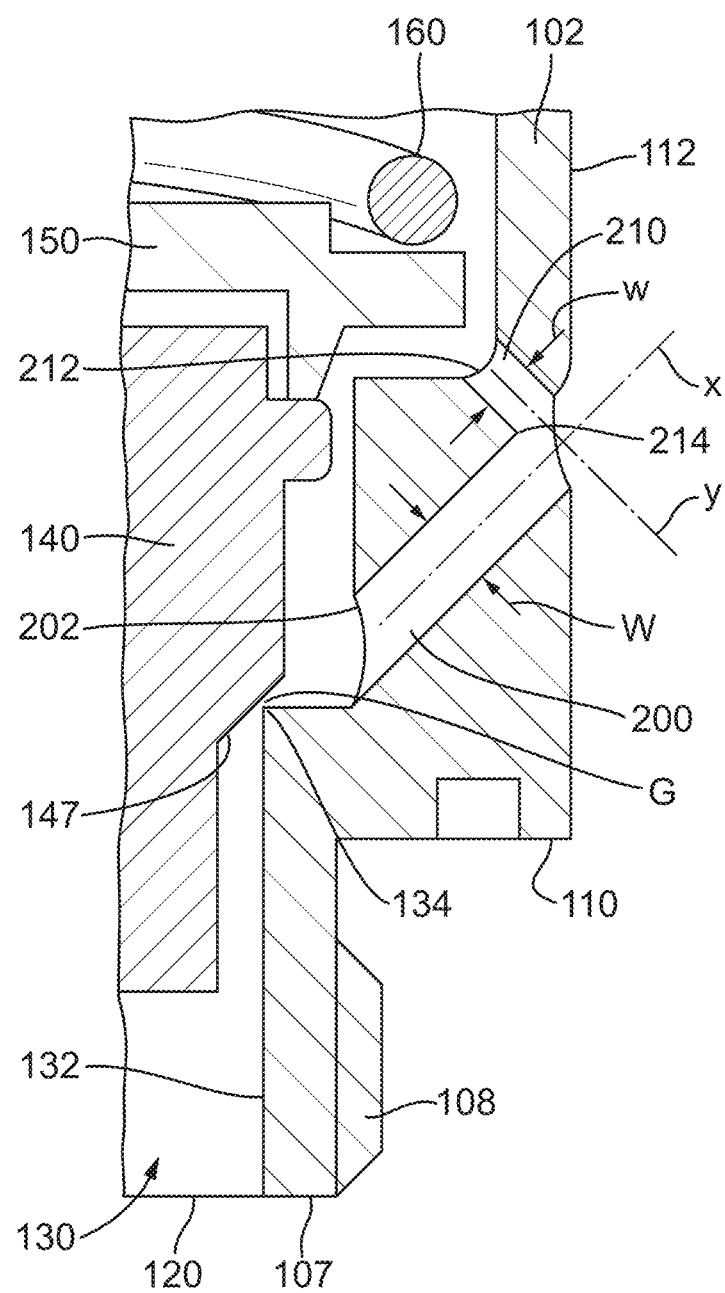
FIG. 3 shows a magnified view of the valve shown in FIG. 2.

FIG. 3 shows a magnified version of FIG. 2, showing the arrangement of the additional channels 210 in more detail.

As referred to herein, "width" may be taken as the shortest distance between two opposing surfaces of a channel, which extends through its longitudinal axis. In the case of a cylindrical channel, therefore, the width would correspond to its diameter.

Each of the exhaust channels 200 may have a central longitudinal axis X, and each of the additional channels 210 may have a central longitudinal axis Y. In various embodiments, the central longitudinal axis X of each exhaust channel 200 may be substantially perpendicular to the central longitudinal axis Y of a respective one of the additional channels 210, although this is not essential to the broadest aspects of the invention.

In use, when the pressure of the pressurised fluid is below the set-point value of the valve 100, the valve 100 will remain as shown in FIG. 2 of the present disclosure, wherein the surface 147 of the plunger 140 is pressed or biased against the rim 134 of the valve housing 102 to substantially prevent fluid from passing from the channel 130 to other portions of the valve 100 (e.g., the exhaust channels 200).

As discussed above the valve 100 is configured to control the release of a pressurised fluid from an environment. The mating portion 106 is configured to mate with a structure that retains the pressurised fluid, such that the channel 130 and plunger 140 are exposed to the pressurised fluid in use. As such, the pressurised fluid will exert a force on the plunger 140 that is opposed by the force of the resilient member 160.

When the force exerted by the pressurised fluid reaches a certain value (e.g., the pressure of the pressurised fluid exceeds the set-point value of the valve 100), it will overcome the force exerted by the resilient member 160, and the plunger 140 will begin to move in the direction of the piston 150, such that the surface 147 moves away from the rim 134 to create a gap G therebetween. High velocity fluid will then flow through the gap G and will be expelled from the valve 100 via the exhaust channels 200. The surface 147 may be angled towards the exhaust channels 200, as shown in FIG. 3, such that fluid flowing through the gap G is directed towards the exhaust channels 200. In one refinement, the angled surface 147 may be substantially parallel with the longitudinal axis X of the exhaust channel 200.

In these situations, high velocity fluid will be moving past the outlets 214 of the additional channels 210. This creates a Venturi effect. That is, the high velocity fluid moving through the exhaust channels 200 will be of a relatively low pressure to the fluid (e.g., air) within the additional channels 210, which draws fluid from within the additional channels 210 and into the flow of the fluid moving through the exhaust channels 200. Fluid within the second chamber 186 of the interior chamber 180 will, therefore, be drawn into the relatively high velocity airflow exiting the exhaust channels 200 via the additional channels 210.

Figure 4:
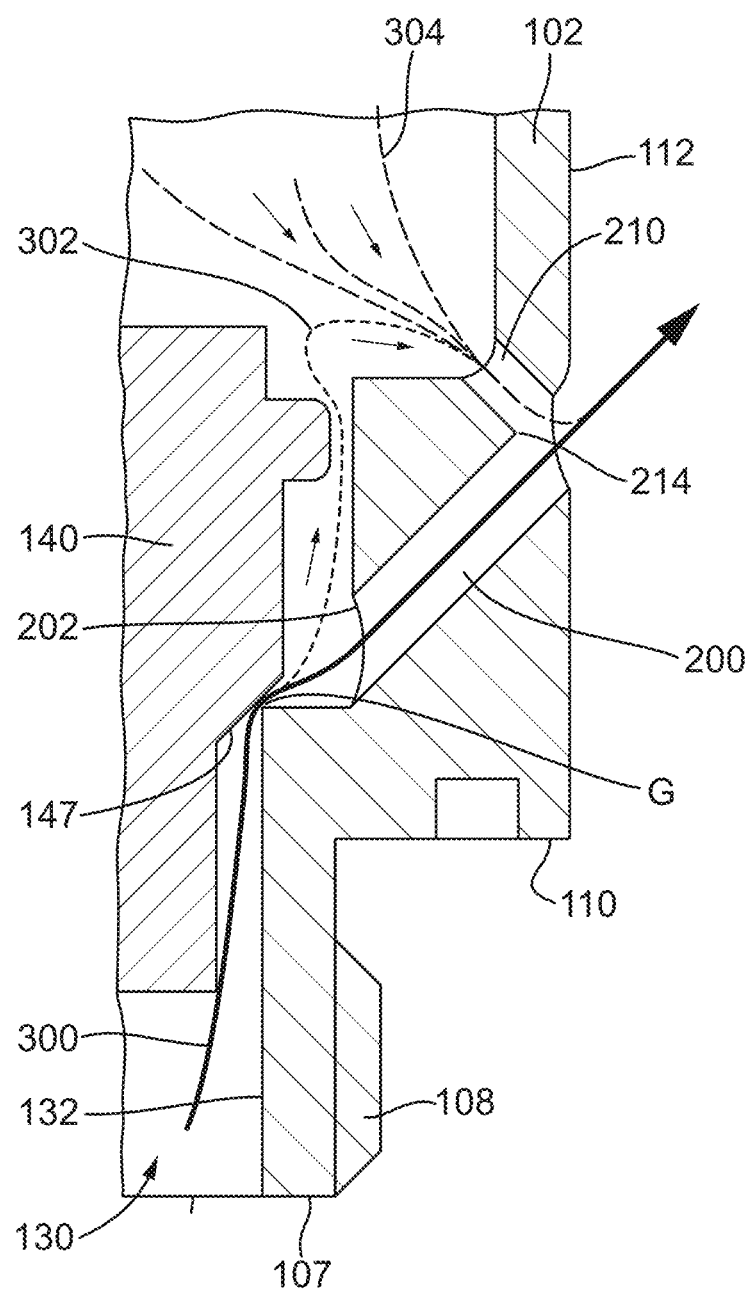
FIG. 4 shows a similar view to FIG. 3, with the various fluid flows depicted therein.

FIG. 4 is similar to FIG. 3 and shows the various fluid flows 300, 302, 304 through the valve 100 when fluid is expelled from the valve 100 at high velocity. A main flow 300 of fluid is exhausted through the gap G and is expelled from the valve 100 via the exhaust channels 200. Some of this fluid may flow past the plunger 140, see arrow 302. However, due to the Venturi effect described above, fluid will be drawn from the second chamber 186 (see fluid flow 304) through the additional channels 210. Any fluid 302 flowing past the plunger 140 will join the flow 304 through the additional channels 210 and ultimately the flow of fluid 300 through the exhaust channels 200.

Figure 1:
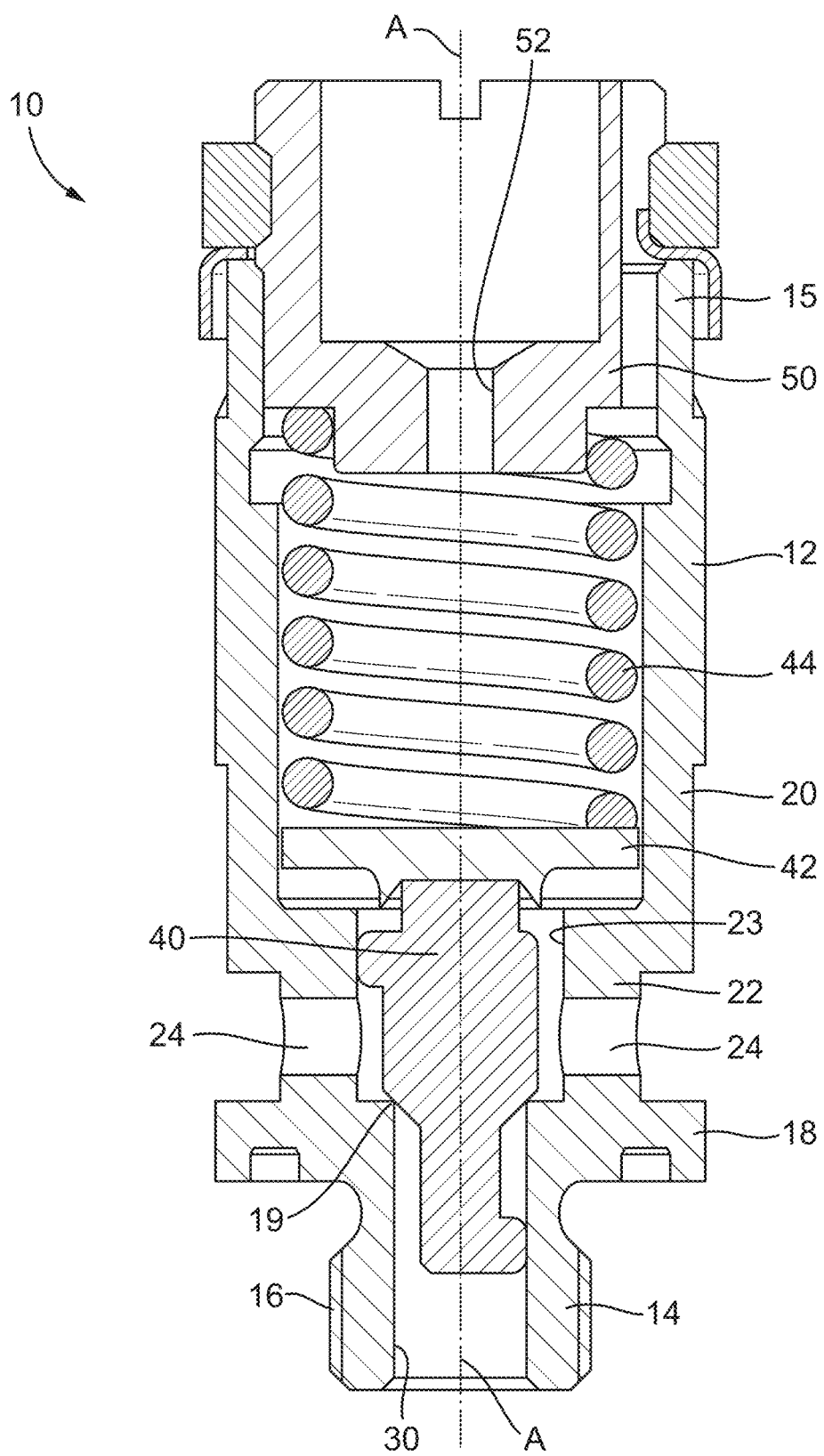
FIG. 1 shows a conventional arrangement for illustrative purposes only.

In contrast to the conventional arrangement shown in FIG. 1, this means that air will not be exhausted through the second chamber 186, but will instead be drawn from the second chamber 186 and into the fluid moving through the exhaust channels 200, via the vent hole 174 in the cap 170 and the additional channels 210. This reduces (or eliminates) the effect of the fluid being exhausted from the environment on the components of the valve 100, in particular the resilient member 160 and plunger 150. For example, the predefined pressure level of the valve 100 may not substantially drift during use.

Further negative effects are prevented should the pressurised fluid be of a high temperature (e.g., above 500° C.), such as in environments associated with gas turbine engines such as a compressor thereof, since the second chamber 186 will not be exposed to the high-temperature fluid that flows through the valve 100. As such, the resilient member 160 may not be exposed to high temperature air, which would further affect its spring constant, the force it exerts and the predefined pressure level of the valve 100.

The Venturi effect may be optimised by tailoring the size and arrangement of the additional channels 210, such as providing a smaller width w of the additional channels 210 as discussed above, or arranging the channels 210 so that they are substantially perpendicular to, or between 80-100 degrees of, the channels 200 as shown in FIGS. 2 and 3. In various embodiments, the outlets 214 of the additional channels 210 may be conical or tapered, which has been found to assist in optimising the Venturi effect.

The vent hole 174 of the cap 170 may be exposed to unpressurised fluid (e.g., cooling or ambient air) that can be drawn in through the second chamber 186 of the interior chamber 180. In the example of a gas turbine engine, this unpressurised fluid may be air at atmospheric pressure, e.g., ambient air.

FIGS. 5A and 5B show the valve 100 located in a section of pipework 304 of a gas turbine engine, which pipework may be located within a nacelle 302 thereof. The valve 100 is located along a section of the pipework 304 within the nacelle 302 and is configured to control the release of pressurised fluid from within the pipework. This illustration is provided to show an example of the valve 100 in situ, although it will be appreciated that the valve 100 could be applied to any situation that requires a pressure relief valve, and the present disclosure is not limited to the application shown.

Although the present disclosure has been described with reference to various embodiments, it will be understood by those skilled in the art that various changes in form and detail may be made without departing from the scope of the invention as set forth in the accompanying claims.

The invention claimed is:

1. A valve for controlling the release of a pressurised fluid from an environment, the valve comprising:
   a fluid inlet for receiving a first fluid from a pressurised environment;
   a housing comprising a first chamber and a fluid passage extending from the fluid inlet to the first chamber;
   one or more exhaust channels in fluid communication with the first chamber such that, in use, the first fluid entering the first chamber from the pressurised environment is exhausted through the one or more exhaust channels;
   a device movable between a closed position and an open position, wherein in the closed position the device is configured to substantially seal the fluid passage and the first chamber such that the first fluid is not able to flow from the fluid passage to the first chamber, and in the open position the device permits the first fluid to flow from the fluid passage to the first chamber;
   a resilient member configured to bias the device towards the closed position; and
   one or more additional fluid channels having an outlet within at least one of the one or more exhaust channels, the one or more additional fluid channels being configured to create a Venturi effect when the first fluid is exhausted through the one or more exhaust channels which draws in a second fluid through the one or more additional channels from a non-pressurised environment external to the valve.

2. The valve as claimed in claim 1, wherein a width (w) of the one or more additional channels is less than a width (W) of the one or more exhaust channels.

3. The valve as claimed in claim 1, wherein an outlet of the one or more additional channels is conical or tapered.

4. The valve as claimed in claim 1, wherein a longitudinal axis (Y) of the one or more additional channels is substantially perpendicular to a longitudinal axis (X) of the one or more exhaust channels.

5. The valve as claimed in claim 1, further comprising:
a second chamber;
wherein the one or more additional channels are in fluid communication with the second chamber, and the resilient member is at least partially located within the second chamber.

6. The valve as claimed in claim 5, wherein the second chamber is vented to the non-pressurised environment.

7. The valve as claimed in claim 6, further comprising:
a cap mounted onto an end of the valve housing and at least partially defining the second chamber,
wherein the cap comprises a port configured as an inlet for the second fluid.

8. The valve as claimed in claim 1, wherein the device comprises:
a surface configured to press against a portion of the valve housing to substantially seal the fluid passage to the first chamber when the device is in its closed position, and move away from the portion of the valve housing to create a gap (G) therebetween to permit the first fluid to flow from the fluid passage to the first chamber when the device is in the open position.

9. The valve as claimed in claim 8, further comprising a piston located between the resilient member and the device, wherein the resilient member biases the piston towards the device to bias the device towards the closed position.

10. The valve as claimed in claim 8, wherein the surface is angled towards the one or more exhaust channels such that, in use, the first fluid flowing through the gap (G) is directed towards the one or more exhaust channels by the angled surface.

11. The valve as claimed in claim 10, wherein the angled surface is substantially parallel with a longitudinal axis (X) of the one or more exhaust channels.

12. The valve as claimed in claim 10, further comprising a piston located between the resilient member and the device, wherein the resilient member biases the piston towards the device to bias the device towards the closed position.

13. The valve as claimed in claim 11, further comprising a piston located between the resilient member and the device, wherein the resilient member biases the piston towards the device to bias the device towards the closed position.

14. An apparatus comprising:
the valve as claimed in claim 1;
and
a structure configured for holding the first fluid under pressure, wherein the fluid inlet of the valve is exposed to the first fluid from the structure, such that the valve is configured for controlling the release of the first fluid from the structure.

15. An apparatus as claimed in claim 14, comprising a gas turbine engine incorporating the valve.

16. A valve for controlling the release of a pressurised fluid from an environment, the valve comprising:
a fluid inlet for receiving a fluid from a pressurised environment;
a housing comprising a first chamber and a fluid passage extending from the fluid inlet to the first chamber;
one or more exhaust channels in fluid communication with the first chamber such that, in use, the fluid entering the first chamber from the pressurised environment is exhausted through the one or more exhaust channels;
a device movable between a closed position and an open position, wherein in the closed position the device is configured to substantially seal the fluid passage and the first chamber such that the fluid is not able to flow from the fluid passage to the first chamber, and in the open position the device permits the fluid to flow from the fluid passage to the first chamber;
a resilient member configured to bias the device towards the closed position; and
one or more additional fluid channels having an outlet within at least one of the one or more exhaust channels, the one or more additional fluid channels being configured to create a Venturi effect when the fluid is exhausted through the one or more exhaust channels,
wherein an outlet of the one or more additional channels is conical or tapered.

17. A valve for controlling the release of a pressurised fluid from an environment, the valve comprising:
a fluid inlet for receiving a fluid from a pressurised environment;
a housing comprising a first chamber and a fluid passage extending from the fluid inlet to the first chamber;
one or more exhaust channels in fluid communication with the first chamber such that, in use, the fluid entering the first chamber from the pressurised environment is exhausted through the one or more exhaust channels;
a device movable between a closed position and an open position, wherein in the closed position the device is configured to substantially seal the fluid passage and the first chamber such that the fluid is not able to flow from the fluid passage to the first chamber, and in the open position the device permits the fluid to flow from the fluid passage to the first chamber;
a resilient member configured to bias the device towards the closed position; and
one or more additional fluid channels having an outlet within at least one of the one or more exhaust channels, the one or more additional fluid channels being configured to create a Venturi effect when the fluid is exhausted through the one or more exhaust channels;
a second chamber;
wherein the one or more additional channels are in fluid communication with the second chamber, and the resilient member is at least partially located within the second chamber, and wherein the second chamber is vented to a non-pressurised environment.

18. The valve as claimed in claim 17, further comprising:
a cap mounted onto an end of the valve housing and at least partially defining the second chamber,
wherein the cap comprises a port configured as an inlet for non-pressurised or ambient fluid.

* * * * *